United States Patent [19]

Juy

[11] 3,830,115
[45] Aug. 20, 1974

[54] GUIDE SLEEVE FOR THE CONTROL CABLES OF CYCLES AND SIMILAR VEHICLES

[76] Inventor: Lucien Charles Hippolyte Juy, 73 Rue General Fauconnet, Dijon-Cote d'Or, France

[22] Filed: June 12, 1972

[21] Appl. No.: 261,805

[30] Foreign Application Priority Data
June 11, 1971 France .............................. 71.22125

[52] U.S. Cl. ............................................. 74/501 R
[51] Int. Cl. .............................................. F16c 1/10
[58] Field of Search . 74/501, 240, 217 B, 242.15 B; 280/236–238, 289; 74/487, 488, 489

[56] References Cited
UNITED STATES PATENTS
3,342,081   9/1967   Conrad ............................ 74/501 P FOREIGN PATENTS OR APPLICATIONS
597,771   11/1925   France ................................. 74/501

Primary Examiner—Samuel Scott
Assistant Examiner—Frank H. McKenzie, Jr.
Attorney, Agent, or Firm—Eric H. Waters

[57] ABSTRACT

A guide sleeve for control cables of cycles or the like, formed of plastic material or light metal, including a profiled contour having a channel and downwardly opening slotted portion for receiving the cable. The sleeve is adapted to be profiled to conform to the tubular frame of the cycle so as to be readily fastened thereto, directly or through suitable fastening collars.

10 Claims, 10 Drawing Figures 3,830,115

GUIDE SLEEVE FOR THE CONTROL CABLES OF CYCLES AND SIMILAR VEHICLES

FIELD OF THE INVENTION

The present invention relates to guide sleeves for the control cables of cycles, motorcycles and similar vehicles.

DISCUSSION OF THE PRIOR ART

It is known that drive or control cables, such as those utilized for gear shifting at the crank gear, or at the rear wheel of cycles, must be guided along tubular frames, particularly in the vicinity of the crank gear. It has already been proposed to employ guiding and supporting members made of metal which are, however, expensive and have relatively complicated shapes, or to use members in the form of metal tubes through which the cables pass. Such members have the disadvantages of insufficiently protecting the cable and in providing excessive friction, which impairs the proper functioning of the control system, while causing rusting of the tubular guide sleeves and cables, with the consequent dangers resulting therefrom.

SUMMARY OF THE INVENTION

The disadvantages in the prior art are overcome by the cable-guiding tunnel or sleeve provided by the present invention, which is basically characterized in that it is preferably, although not necessarily, made of a plastic material having superior properties and which is designed to provide within its cross-section, a channel having the configuration of a downwardly opening slot, the bottom of which is shaped in cross-section. Furthermore, the sleeve is formed along its length so as to be adapted to be directly secured, or by means of a suitable collar or other intermediate members, to the frame tube or other portions of the cycle.

BRIEF DESCRIPTION OF THE DRAWINGS

These and other features of the invention will be more readily understood from the following detailed description having reference to the accompanying drawings, in which.

DETAILED DESCRIPTION

Figure 1:
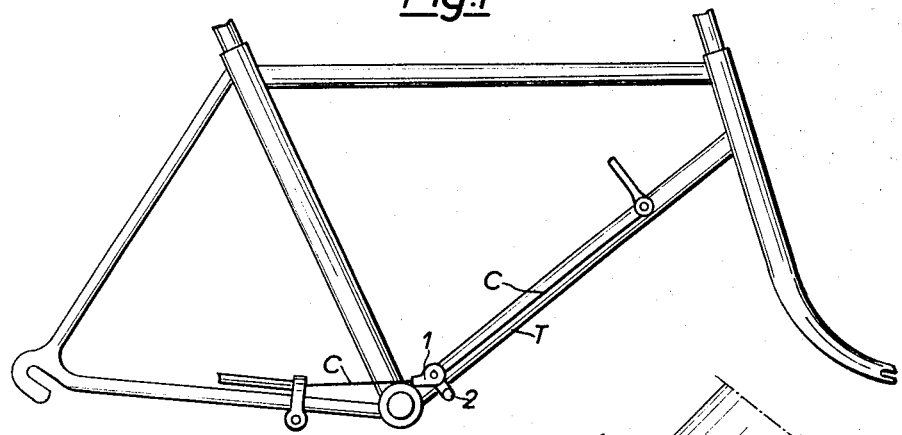
FIG. 1 illustrates, by way of example, the combination of a cycle frame and a cable drive guided within a sleeve in accordance with the invention.

In a preferred embodiment of the invention, illustrated by way of example in the drawings, the cable guiding sleeve is made of a plastic material having good mechanical properties, particularly with regard to hardness and wearability. Preferably, although not necessarily, the sleeve is made of a plastic material commercially sold under the name "DELRIN," which has excellent properties and a minimum coefficient of friction. It is to be understood, however, that it is within the scope of the present invention to form the sleeve from a light metal or alloy, possibly through pressure molding.

Referring now in detail to the drawings, the cable-guiding sleeve, designated generally by the reference numeral 1, is a single piece made by molding or injection.

In its interior and extending its length, the sleeve has a channel 1a forming a downwardly opening slot, as viewed from the mounting position on a frame. The slot has a width which is larger than the diameter of the cable C which is to be positioned therein. The sleeve may have, if desired, a plurality of channels 1a.

Figure 2:
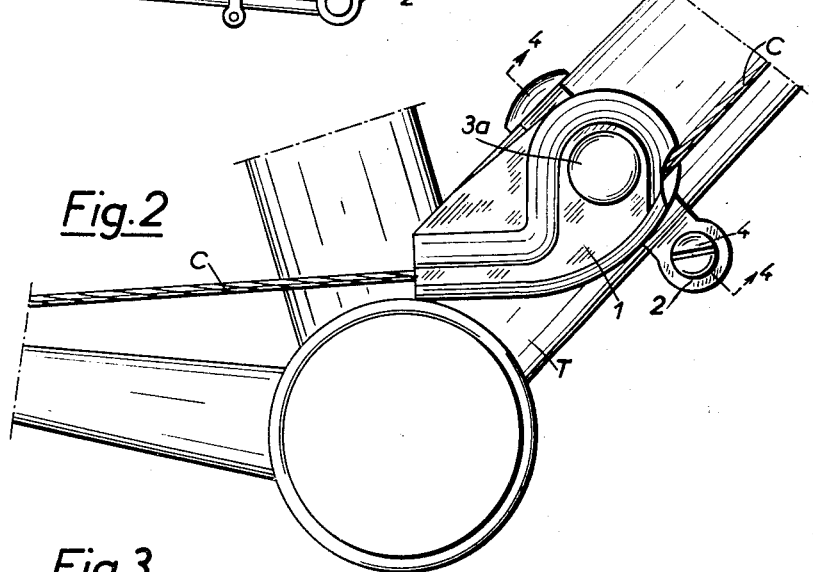
FIG. 2 illustrates on an enlarged scale the cable-guiding sleeve and the cable.

The bottom of channel 1a along with the cable C is guided is rounded off in cross-section and is provided along its length with a cable supporting and guiding curved section 1b. This section is designed to assure suitable alignment of the cable along the tubular frame T, which connects the steering to the crank gear, in effect, alignment parallel to the axis of the tube, as shown in FIGS. 1 and 2. The curved portion 1b of the channel extends into, as shown in the illustrated embodiment, a straight portion 1c. At the outlet end of the portion 1c there may be formed a recessed chamber 1d which acts as a stop for a sheath (not shown) for the cable C, in which the sheath protects the cable at distances beyond sleeve 1.

The sleeve is also shaped so as to be adapted to and secured to the cycle frame, generally at the lower end of the tubular frame which connects the steering to the cycle crank gear. In order to accomplish this, the sleeve is provided with an enlarged portion 1e having an opening 1f providing for the passage of a rivet or screw.

Figure 3:
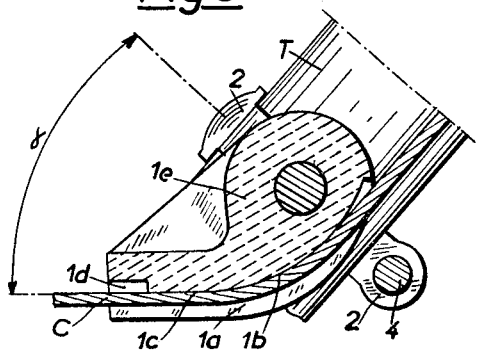
FIG. 3 is a longitudinal sectional view of the sleeve taken along the Line 3-3 in FIG. 4.
Figure 4:
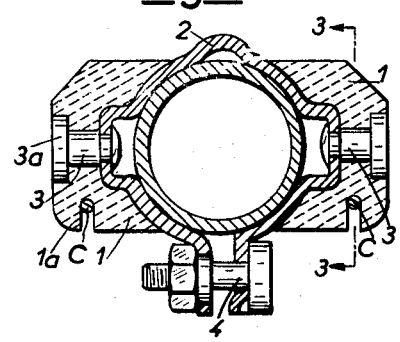
FIG. 4 is a cross-sectional view taken along Line 4-4 in FIG. 2.
Figure 5:
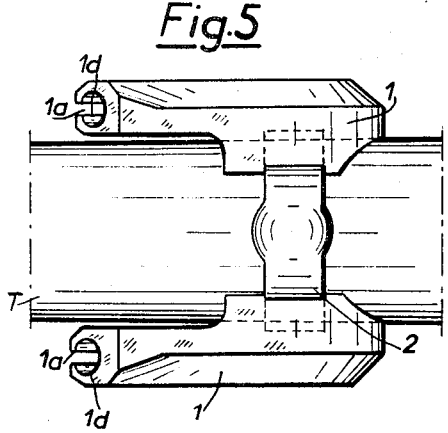
FIG. 5 is a plan view taken along Line 5-5 in FIG. 2, two cable-guiding sleeves being mounted symmetrically on either side of the frame tube.
Figure 6:
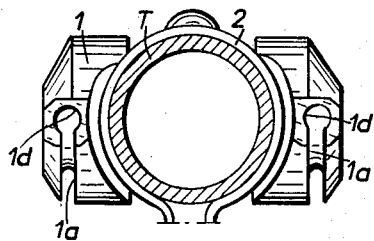
FIG. 6 is a view taken along line 6-6 in FIG. 2.
Figure 7:
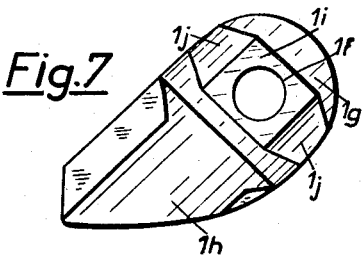
FIG. 7 is an exterior view of the sleeve, viewed from the engaging and mounting side thereof.

The sleeve has formed therein, and on the side which engages the tubular frame (FIG. 7), a track 1g which is circular in cross-section and which corresponds to the diameter of the tubular frame T. The axes of the track and of the channel along its straight line portion form an angle $\alpha$ (FIGS. 2, 3, 7) suitably chosen to correspond to the gear shifting arrangement of cable C.

The bearing in the portion 1g extends primarily along the axis of the opening 1f, so as to provide for a firm contact and stable support. Externally the bearing face 1g, a cut-out 1h reduces the thickness of the sleeve and prevents contact thereof with the tubular frame.

In the face 1g there is formed a housing 1i which is adapted to cooperate with a securing member which, in the example shown in the drawings, is a collar 2 arranged to be secured about the tubular frame T.

The collar 2 is provided with projecting square bosses 2a which have openings 2b therein. Housings 1i engage the bosses 2a in order to position the sleeve, while on either side of the housings 1i there are provided cut-outs 1j for the passage of the arms or wings of the collar 2.

A rivet 3, the head 3a of which engages in a housing 1k of the opening 1f, extends through the sleeve and through the collar 2 and fastens these members together by internal clamping thereof. If desired, these members may be detachably assembled together by means of a screw having an elastic stop nut or washer.

The collar 2 is provided with two bosses 2a for securing two identical sleeves 1, right and left hand, but arranged symmetrically on either side of the tubular frame T so as to, at one side, guide the gear shift cable at the crank gear, and at the other side guide the gear shift cable mounted in proximity to the rear wheel. This is an essentially known mounting system. It is to be understood, however, that the collar may serve to secure a single sleeve for a single gear shift cable.

The collar is secured to the tubular frame, generally in a detachable manner, by means of a screw and nut 4 or other suitable fastening means. The collar may be constructed of a single piece, the ends of which may be spread apart, or it may be formed of two separate parts.

Figure 9:
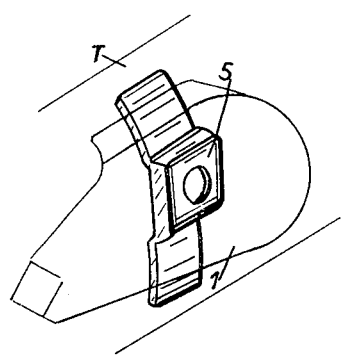
FIG. 9 shows a base plate welded to a frame and with a cable-guiding sleeve illustrated in broken lines.

In lieu of a collar, the sleeve or sleeves 1 may be secured by means of base plates 5 which are welded or brazed onto the tubular frame T, as shown in FIG. 9.

Figure 8:
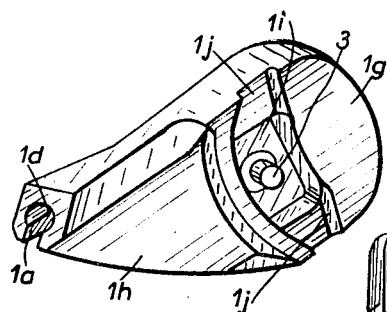
FIG. 8 is an exploded perspective view showing two symmetrical cable guiding sleeves including a collar and fastening means.
Figure 8:
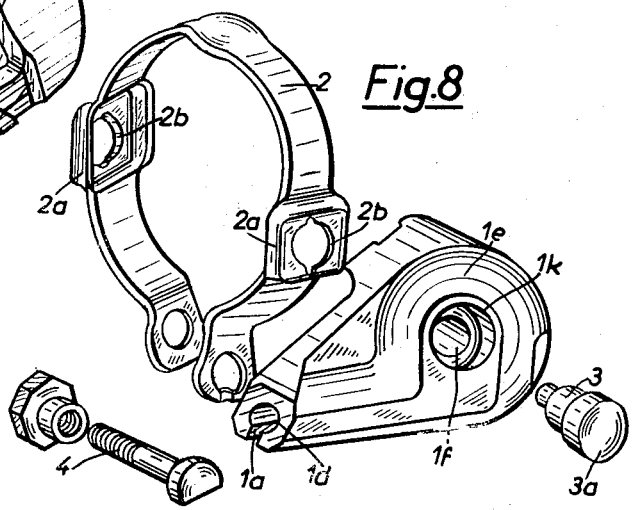
Figure 10:
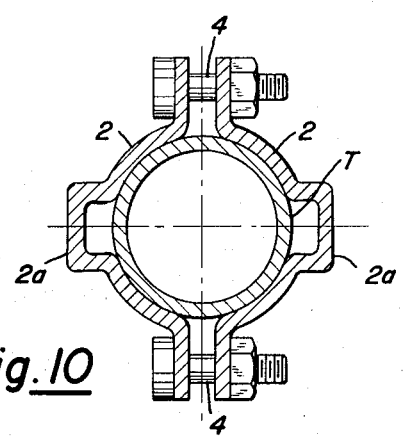
FIG. 10 shows a detailed view, in section, of a modified collar and fastening means.

The collar 2 shown in FIG. 10 is similar to that in FIG. 8, however, in this instance the collar is formed of two separate complementary halves which are interconnected at opposite ends by screws and nuts 4 so as to clampingly engage tubular frame T.

The cable guiding sleeve according to the present invention is substantially simplified in manufacture and reduced in cost. Its function is improved in that the cable slides more easily due to the superior coefficient of friction of the tunnel. The sleeve requires no lubrication, and any danger of cable gripping or deterioration within the channel through which the cable passes is eliminated. The sleeve is not subject to deterioration, it may be colored, and its molded configuration made to present a pleasing esthetic appearance. Furthermore, the sleeve insures firm and stable attachment thereof to the tubular frame of the cycle, thereby forming a precise and rigid assembly in conjunction with any collars or base plates.

It is to be understood that the invention is not limited to the particular forms described and illustrated herein and that any variation thereof is to be considered to be within the scope of the invention as defined in the appended claims.

What is claimed is:

1. A guide sleeve for the control cable of a cycle, motorcycle or similar vehicle; said guide sleeve having formed therein at least one longitudinally extending channel including a downwardly opening slot portion, the bottom of said channel being profiled in cross-section and longitudinally there along, said sleeve including means for fastening said sleeve to a tubular frame of said cycle, said fastening means including an enlarged portion of said sleeve having an opening therethrough for passage of a fastening member for mounting said sleeve on said tubular frame, said sleeve having, on one side thereof and engaging said tubular frame, an annular track corresponding to the diameter of the tubular frame, the longitudinal axes of said track and of said channel being at a predetermined angle relative to each other to provide a change of direction and of the shifting angle of the cable.

2. A guide sleeve as claimed in claim 1, said frame-engaging track extending along the axis of said opening, said sleeve having reduced thickness portions to avoid contact between said sleeve and the frame adjacent the engaging face of said track, and a housing cooperatively engaging a boss member having an opening for a fastening means for mounting of said sleeve on said tubular frame.

3. A guide sleeve as claimed in claim 2, said fastening means comprising a collar having a boss for assembling said sleeve.

4. A guide sleeve as claimed in claim 2, said collar comprising a one-piece collar having a boss for assembling said sleeve.

5. A guide sleeve as claimed in claim 2, said sleeve being a right or left hand sleeve, said collar comprising a two-piece collar having two bosses including openings for symmetrically attaching a right or left hand sleeve to said tubular frame.

6. A guide sleeve as claimed in claim 1, said fastening means comprising a base plate welded onto said tubular frame.

7. A guide sleeve as claimed in claim 1, said sleeve being formed of a light metal or metal alloy.

8. A guide sleeve as claimed in claim 1, said sleeve being formed of a rigid, molded plastic material.

9. A guide sleeve as claimed in claim 1, said slot portion having a width larger than the diameter of the control cable, the bottom of said channel adapted to be contacted by the cable being rounded in cross-section and having a curved longitudinally extending cable-supporting and guiding portion.

10. A guide sleeve as claimed in claim 9, said curved longitudinally extending cable-supporting and guiding portion of the channel extending into a linear portion terminating in a recessed chamber, said chamber being adapted to form a stop for a control cable sheath.

* * * * *